(12) United States Patent
Vestman et al.

(10) Patent No.: US 12,208,348 B2
(45) Date of Patent: Jan. 28, 2025

(54) CONICAL FILTER WITH TURBINE POWERED SCRAPER

(71) Applicant: MIMBLY AB, Gothenburg (SE)

(72) Inventors: Carl Emil Vestman, Gothenburg (SE); Nicolas Maxant, Gothenburg (SE)

(73) Assignee: MIMBLY AB, Gothenburg (SE)

( * ) Notice: Subject to any disclaimer, the term of this patent is extended or adjusted under 35 U.S.C. 154(b) by 493 days.

(21) Appl. No.: 17/763,123

(22) PCT Filed: Oct. 1, 2020

(86) PCT No.: PCT/SE2020/050920
§ 371 (c)(1),
(2) Date: Mar. 23, 2022

(87) PCT Pub. No.: WO2021/066716
PCT Pub. Date: Apr. 8, 2021

(65) Prior Publication Data
US 2022/0339562 A1 Oct. 27, 2022

(30) Foreign Application Priority Data
Oct. 4, 2019 (SE) .................................. 1930313-0

(51) Int. Cl.
*B01D 29/64* (2006.01)
*B01D 29/35* (2006.01)
*C02F 1/00* (2023.01)

(52) U.S. Cl.
CPC ......... *B01D 29/6476* (2013.01); *B01D 29/35* (2013.01); *C02F 1/001* (2013.01);
(Continued)

(58) Field of Classification Search
None
See application file for complete search history.

(56) References Cited

U.S. PATENT DOCUMENTS

| | | | | |
|---|---|---|---|---|
| 5,404 A | * | 12/1847 | Watson ................ | B01D 29/118 210/415 |
| 15,455 A | * | 7/1856 | Mendenhall et al. .... | B07B 1/24 209/296 |

(Continued)

FOREIGN PATENT DOCUMENTS

| | | |
|---|---|---|
| CN | 110180237 | 8/2019 |
| FR | 1159385 | 6/1958 |

(Continued)

*Primary Examiner* — Robert J Popovics
(74) *Attorney, Agent, or Firm* — DUANE MORRIS LLP; Gregory M. Lefkowitz; Joaquin Hernandez (57) ABSTRACT

An assembly (1) for filtering water comprising: a filter (10) forming a permeable receptacle for fluid to be filtered, an actuating inlet (300) for providing a stream of water, a filter fluid inlet (302) for providing fluid to be filtered to the filter (10), and, a rotatable cleaning structure (20) for cleaning the filter (10), wherein the structure (20) comprises at least one scraper (201) extending along and substantially abutting a first surface (101) of the filter (10), the scraper (201) being rotatable with respect to the first surface (101) of the filter (10), and wherein the structure (20) further comprises at least one rotatable element (250) arranged for receiving the stream of water, the stream of water being receivable in, and filterable by, the filter (10) and wherein the element (250) is rotationally engaged with the scraper (201) such that the stream of water providing a rotational force to the element (250), rotates the scraper (201) with respect to the first surface (101) of the filter.

9 Claims, 7 Drawing Sheets

(52) U.S. Cl.
CPC .... *B01D 2201/02* (2013.01); *B01D 2201/583* (2013.01); *C02F 2303/16* (2013.01); *C02F 2307/12* (2013.01)

(56) References Cited

U.S. PATENT DOCUMENTS

| | | | | |
|---|---|---|---|---|
| 241,653 A * | 5/1881 | Harrison | ............... | A47J 43/25 241/153 |
| 337,423 A * | 3/1886 | Moore | ............... | B01D 24/10 210/411 |
| 431,448 A * | 7/1890 | Dixon | ............... | B01D 29/33 210/512.1 |
| 554,312 A * | 2/1896 | Robinson | ............... | B01D 24/007 210/415 |
| 565,089 A * | 8/1896 | Prince | ............... | B02C 13/26 210/415 |
| 578,179 A * | 3/1897 | Wolford | ............... | B01D 29/118 210/414 |
| 580,209 A * | 4/1897 | Davidson et al. | ... | B01D 29/118 210/414 |
| 598,383 A * | 2/1898 | Murney | ............... | B01D 24/007 210/415 |
| 664,833 A * | 1/1901 | Collins | ............... | B01D 29/33 166/170 |
| 670,730 A * | 3/1901 | Prochazka | ............... | C12C 1/00 210/415 |
| 672,003 A * | 4/1901 | Lynn | ............... | B01D 29/118 210/414 |
| 716,989 A * | 12/1902 | Davidson | ............... | B01D 29/118 210/414 |
| 773,220 A * | 10/1904 | Patterson | ............... | B03B 9/061 68/1 |
| 788,922 A * | 5/1905 | Mackenzie | ............... | B01D 29/05 210/414 |
| 810,020 A * | 1/1906 | Applegate | ............... | B01D 33/44 210/396 |
| 925,040 A * | 6/1909 | Senott | ............... | B01D 29/118 209/358 |
| 950,118 A * | 2/1910 | Rood | ............... | B01D 29/118 210/415 |
| 954,313 A * | 4/1910 | Lillyman | ............... | B01D 35/153 210/396 |
| 969,364 A * | 9/1910 | Grootenhuis | ............... | B01D 33/06 210/354 |
| 1,012,134 A * | 12/1911 | Holliday | ............... | B01D 65/00 210/396 |
| 1,033,745 A * | 7/1912 | Smith | ............... | B01D 29/114 210/396 |
| 1,038,167 A * | 9/1912 | Maitland | ............... | B01D 46/10 55/296 |
| 1,130,725 A * | 3/1915 | Getts | ............... | B01D 33/067 55/296 |
| 1,247,979 A * | 11/1917 | McHardy et al. | ...... | C02F 1/688 210/415 |
| 1,443,918 A * | 1/1923 | King | ............... | B01D 25/38 210/415 |
| 1,510,863 A * | 10/1924 | Rose | ............... | B01D 29/6415 210/414 |
| 1,525,449 A * | 2/1925 | Johnson | ............... | B01D 29/66 210/414 |
| 1,592,149 A * | 7/1926 | Murden | ............... | A47J 43/22 4/291 |
| 1,667,465 A * | 4/1928 | Wait | ............... | B01D 33/466 210/791 |
| 1,675,612 A * | 7/1928 | Laird | ............... | B04B 3/00 209/270 |
| 1,688,429 A * | 10/1928 | Murden | ............... | A47J 43/22 210/415 |
| 1,741,444 A * | 12/1929 | Slider | ............... | B01D 29/6415 210/355 |
| 1,993,214 A * | 3/1935 | Hass | ............... | B01D 29/82 210/489 |
| 2,012,680 A * | 8/1935 | Hammes | ............... | E03C 1/2665 241/46.06 |
| 2,022,336 A * | 11/1935 | Bower | ............... | E02B 5/085 210/157 |
| 2,066,479 A * | 1/1937 | Macisaac | ............... | B01D 29/01 210/414 |
| 2,089,215 A * | 8/1937 | Lomax | ............... | A47J 43/145 210/383 |
| 2,089,702 A * | 8/1937 | Lomax | ............... | B01D 29/6476 210/408 |
| 2,107,040 A * | 2/1938 | Lomax | ............... | B01D 29/906 210/773 |
| 2,125,532 A * | 8/1938 | James | ............... | B01D 29/118 210/414 |
| 2,202,191 A * | 5/1940 | Cuno | ............... | B01D 29/48 210/497.1 |
| 2,236,769 A * | 4/1941 | Armbruster | ........ | B01D 21/0039 209/225 |
| 2,240,841 A * | 5/1941 | Flynn | ............... | B01F 27/112 241/98 |
| 2,247,439 A * | 7/1941 | Hawes | ............... | B01F 27/92 366/324 |
| 2,286,400 A * | 6/1942 | Chalmers | ............... | B01D 29/64 210/414 |
| 2,295,937 A * | 9/1942 | Crane | ............... | B01D 33/11 210/381 |
| 2,332,965 A * | 10/1943 | Ducommun | ......... | B01D 29/114 210/696 |
| 2,408,741 A * | 10/1946 | Dodge | ............... | B01D 29/356 210/355 |
| 2,440,384 A * | 4/1948 | Schenke | ............ | B01D 29/6476 210/415 |
| 2,482,166 A * | 9/1949 | Gage | ............... | A47L 5/32 15/352 |
| 2,485,547 A * | 10/1949 | Blau | ............... | E04D 13/0409 210/354 |
| 2,553,567 A * | 5/1951 | Fette | ............... | C12C 7/24 210/414 |
| 2,578,274 A * | 12/1951 | Dunton | ............... | D01F 2/08 241/46.11 |
| 2,672,983 A * | 3/1954 | Blau | ............... | E04D 13/0409 210/354 |
| 2,678,732 A * | 5/1954 | Banks | ............... | B01D 29/6476 210/414 |
| 2,747,741 A * | 5/1956 | Jacobson | ............... | B01D 29/46 210/411 |
| 2,761,627 A * | 9/1956 | Reed | ............... | E03C 1/2665 241/46.06 |
| 2,886,254 A * | 5/1959 | Rohlinger | ............. | B02C 18/062 241/86.1 |
| 2,946,444 A * | 7/1960 | Zievers | ............... | B01D 29/828 210/535 |
| 2,954,841 A * | 10/1960 | Reistle, Jr. | ......... | B01D 19/0052 55/416 |
| 3,108,951 A * | 10/1963 | Scheel | ............... | B04B 15/12 210/376 |
| 3,214,019 A * | 10/1965 | Griffin, III | ............... | E21B 21/06 415/121.2 |
| 3,241,675 A * | 3/1966 | Pashaian | ............. | B01D 33/801 210/360.2 |
| 3,249,227 A * | 5/1966 | Long | ............... | E21B 21/063 210/512.1 |
| 3,341,020 A * | 9/1967 | Sivadon | ............... | E04D 13/0409 52/12 |
| 3,367,506 A * | 2/1968 | Rosaen | ............... | B01D 35/16 210/411 |
| 3,375,776 A * | 4/1968 | Dyson | ............... | B02C 18/0092 241/97 |
| 3,394,809 A * | 7/1968 | Hunter | ............... | D21D 5/06 210/415 |
| 3,446,663 A * | 5/1969 | Olnick | ............... | B04B 5/12 127/23 |
| 3,446,665 A * | 5/1969 | Aranguren | ............... | C08B 30/00 127/23 |
| 3,448,858 A * | 6/1969 | Mills | ............... | B01D 21/267 209/210 |

(56) References Cited

U.S. PATENT DOCUMENTS

| | | | | |
|---|---|---|---|---|
| 3,472,159 A * | 10/1969 | Washburn | D21C 9/02 | 100/145 |
| 3,622,006 A * | 11/1971 | Brunner | B01D 35/14 | 210/448 |
| 3,640,395 A * | 2/1972 | Kinney | B01D 29/682 | 210/411 |
| 3,645,699 A * | 2/1972 | Brodie | B01D 9/0059 | 62/545 |
| 3,739,915 A * | 6/1973 | Kehoe | B01D 29/118 | 210/399 |
| 3,843,062 A * | 10/1974 | Neidl | B01D 35/26 | 241/46.11 |
| 3,937,397 A * | 2/1976 | Zitke | B04B 11/06 | 494/65 |
| 3,959,140 A * | 5/1976 | Legras | B01D 29/94 | 210/489 |
| 3,979,194 A * | 9/1976 | Wiser | B01D 50/20 | 55/296 |
| 3,997,441 A * | 12/1976 | Pamplin, Jr. | B01D 37/02 | 210/791 |
| 4,003,837 A * | 1/1977 | Osborne | B01D 29/6476 | 241/43 |
| 4,024,062 A * | 5/1977 | Holthuis | B01D 29/86 | 210/219 |
| 4,041,854 A * | 8/1977 | Cox | B30B 9/12 | 100/145 |
| 4,049,244 A * | 9/1977 | Hedrich | B29B 7/82 | 366/244 |
| 4,062,776 A * | 12/1977 | Blok | B01D 33/50 | 210/403 |
| 4,130,478 A * | 12/1978 | Swallow | B01D 29/908 | 209/389 |
| 4,140,629 A * | 2/1979 | Martindale | B01D 33/60 | 210/403 |
| 4,183,470 A * | 1/1980 | Hovartos | E03C 1/2665 | 241/46.11 |
| 4,193,865 A * | 3/1980 | Aario | B07B 1/20 | 210/415 |
| 4,210,539 A * | 7/1980 | Shiban | B01D 33/073 | 210/402 |
| 4,271,540 A * | 6/1981 | Clifton | E03D 9/10 | 241/46.11 |
| 4,337,158 A * | 6/1982 | Bodine | B07B 1/50 | 210/415 |
| 4,347,134 A * | 8/1982 | Svehaug | B01D 29/6476 | 210/405 |
| 4,478,718 A * | 10/1984 | Saget | B04B 5/12 | 209/714 |
| 4,582,603 A * | 4/1986 | Nasse | B01D 29/688 | 210/333.1 |
| 4,602,460 A * | 7/1986 | Langenbach | E04D 13/08 | 210/111 |
| 4,657,636 A * | 4/1987 | Satomi | B01D 29/036 | 241/46.11 |
| 4,849,105 A * | 7/1989 | Borchert | B01D 29/33 | 210/411 |
| 4,902,412 A * | 2/1990 | Surber, III | E04H 4/1236 | 210/167.13 |
| 5,065,901 A * | 11/1991 | Brane | G01F 15/001 | 222/14 |
| 5,080,788 A * | 1/1992 | Chen | B01D 29/90 | 210/441 |
| 5,085,771 A * | 2/1992 | Huang | B01D 29/52 | 210/512.3 |
| 5,275,728 A * | 1/1994 | Koller | B01D 29/117 | 210/333.1 |
| 5,316,685 A * | 5/1994 | Stein | B07B 1/24 | 426/489 |
| 5,344,232 A * | 9/1994 | Nelson | B01F 33/5011 | 366/195 |
| 5,435,444 A * | 7/1995 | Satomi | B01D 36/02 | 210/415 |
| 5,514,270 A * | 5/1996 | Barzuza | B01D 29/70 | 210/411 |
| 5,597,076 A * | 1/1997 | Kershner | B07B 4/06 | 209/616 |
| 5,601,690 A * | 2/1997 | Gauld | D21D 5/026 | 209/234 |
| 5,688,402 A * | 11/1997 | Green | B01D 29/036 | 210/415 |
| 5,714,065 A * | 2/1998 | Huder | B01D 29/6415 | 55/296 |
| 5,728,297 A * | 3/1998 | Koller | B01D 29/23 | 210/411 |
| 5,851,087 A * | 12/1998 | Berry, III | B01D 29/15 | 210/161 |
| 6,017,300 A * | 1/2000 | Herman | B04B 9/06 | 210/167.02 |
| 6,089,790 A * | 7/2000 | Berry, III | E03B 3/04 | 138/41 |
| 6,200,361 B1 * | 3/2001 | Krymsky | B01D 50/00 | 55/319 |
| 6,213,929 B1 * | 4/2001 | May | B04B 9/06 | 494/24 |
| 6,258,594 B1 * | 7/2001 | Nakaya | A47K 11/00 | 210/414 |
| 6,337,308 B1 * | 1/2002 | Adams | B01F 33/83 | 366/302 |
| 6,402,948 B1 * | 6/2002 | Pakki | B01D 29/906 | 210/222 |
| 6,520,752 B1 * | 2/2003 | Hosford | B01D 29/114 | 415/121.2 |
| 6,562,763 B2 * | 5/2003 | Adams | E21B 21/062 | 366/302 |
| 6,571,957 B1 * | 6/2003 | Doelle | D21D 5/023 | 162/380 |
| 6,581,859 B2 * | 6/2003 | Adams | B01F 25/451 | 241/101.8 |
| 6,599,005 B2 * | 7/2003 | Van Der Wel | B01F 27/806 | 366/326.1 |
| 6,602,180 B2 * | 8/2003 | Herman | B04B 7/12 | 184/6.24 |
| 6,627,374 B2 * | 9/2003 | Fumita | G03G 9/0815 | 430/137.17 |
| 7,077,957 B2 * | 7/2006 | Posselt | B01D 29/6415 | 210/415 |
| 7,258,238 B2 * | 8/2007 | Raghupathy | B01D 29/6476 | 210/411 |
| 7,351,269 B2 * | 4/2008 | Yau | A47L 9/20 | 55/296 |
| 7,501,058 B1 * | 3/2009 | Lawrence, Sr. | B01D 33/073 | 210/232 |
| 7,641,767 B2 * | 1/2010 | Binder | D21D 5/26 | 162/57 |
| 7,718,055 B2 * | 5/2010 | Iou | E04D 13/0409 | 52/302.1 |
| 7,802,739 B2 * | 9/2010 | Scorvo | E03C 1/266 | 241/46.013 |
| 7,972,108 B2 * | 7/2011 | Fonkenell | F03B 13/08 | 415/121.2 |
| 7,987,778 B1 * | 8/2011 | DeWaard | B30B 9/12 | 100/112 |
| 8,182,674 B2 * | 5/2012 | Prigent | B04C 7/00 | 415/121.2 |
| 8,201,495 B2 * | 6/2012 | DeWaard | B30B 9/12 | 100/37 |
| 8,251,695 B2 * | 8/2012 | Falinower | C04B 11/0281 | 432/58 |
| 8,360,250 B2 * | 1/2013 | Nguyen | F16K 31/402 | 210/415 |
| 8,425,670 B2 * | 4/2013 | Carlsson | C10G 31/10 | 95/19 |
| 8,663,472 B1 * | 3/2014 | Mallard | B01D 36/045 | 210/304 |
| 8,794,222 B2 * | 8/2014 | Schwandt | F01M 13/022 | 123/573 |
| 8,801,359 B2 * | 8/2014 | Sherrer | F03B 17/062 | 415/90 |

(56) References Cited

U.S. PATENT DOCUMENTS

| | | | | |
|---|---|---|---|---|
| 8,882,999 B2* | 11/2014 | Levitt | B01D 21/267 | 494/83 |
| 8,960,450 B2 | 2/2015 | Caffell | B04C 5/22 | 210/512.1 |
| 8,974,567 B2 | 3/2015 | Verdegan | F01M 13/04 | 55/400 |
| 9,050,610 B2 | 6/2015 | Caffell | B01D 36/00 | |
| 9,101,859 B2 | 8/2015 | Jons | B04C 5/103 | |
| 9,186,604 B1* | 11/2015 | Jons | B04C 5/04 | |
| 9,192,946 B2 | 11/2015 | Ramalingam | B04C 3/06 | |
| 9,211,489 B2 | 12/2015 | Riggers | B08B 5/04 | |
| 9,409,106 B2 | 8/2016 | Levitt | B01D 29/117 | |
| 9,561,454 B2 | 2/2017 | Browning | B01D 29/035 | |
| 9,616,363 B2* | 4/2017 | Osman Oguz | B01D 29/94 | |
| 9,816,282 B2 | 11/2017 | Chick | E04H 4/1245 | |
| 9,895,635 B2 | 2/2018 | Levitt | B01D 29/6415 | |
| 9,968,872 B2 | 5/2018 | Carayon | B01D 33/073 | |
| 10,041,732 B2* | 8/2018 | Shortt | F26B 5/08 | |
| 10,207,205 B2 | 2/2019 | Shrivastava | B04C 5/081 | |
| 10,226,774 B2 | 3/2019 | Franko | B07B 1/20 | |
| 10,286,338 B2 | 5/2019 | Levitt | B01D 29/23 | |
| 10,286,339 B2 | 5/2019 | Crandall | B01D 35/02 | |
| 10,391,429 B2 | 8/2019 | Carayon | B01D 33/503 | |
| 10,449,701 B2 | 10/2019 | Kitamura | B01F 35/2209 | |
| 10,478,791 B2 | 11/2019 | Morinaga | B01F 23/40 | |
| 10,549,224 B2 | 2/2020 | Carayon | B01D 33/503 | |
| 10,632,703 B2 | 4/2020 | Oyama | B01F 27/074 | |
| 10,646,801 B2 | 5/2020 | Tameroglu | B01D 29/6415 | |
| 10,688,419 B2 | 6/2020 | Browning | B01D 29/688 | |
| 10,828,583 B2 | 11/2020 | Takahashi | B01D 29/11 | |
| 11,083,985 B2 | 8/2021 | Nellis | B01D 46/00 | |
| 11,103,812 B2 | 8/2021 | Canaia | B29C 48/2545 | |
| 11,167,225 B2 | 11/2021 | Levitt | B01D 29/23 | |
| 11,173,638 B2 | 11/2021 | Kitamura | B01F 27/0723 | |
| 11,207,617 B2 | 12/2021 | Arai | B01D 29/90 | |
| 11,224,830 B2 | 1/2022 | Wildermuth | B01D 29/96 | |
| 11,278,826 B2 | 3/2022 | Deutschmeyer | B01D 29/688 | |
| 11,358,077 B2 | 6/2022 | Muenzer | C02F 1/004 | |
| 11,441,305 B1* | 9/2022 | Alhazza | E04D 13/0409 | |
| 11,446,598 B2* | 9/2022 | Holm | B01D 46/0031 | |
| 11,484,818 B2* | 11/2022 | De Los Reyes, III | B01D 29/114 | |
| 11,691,100 B2 | 7/2023 | Takahashi | B01D 46/2403 | 55/296 |
| 11,872,507 B2 | 1/2024 | Jellinggaard | B01D 29/682 | |
| 11,951,431 B2 | 4/2024 | Holm | B01D 46/0001 | |
| 11,969,675 B2 | 4/2024 | Okuno | B01D 29/902 | |
| 12,053,750 B2 | 8/2024 | Zhang | B01F 27/17 | |
| 12,083,526 B1* | 9/2024 | Nassef | B01F 33/83611 | |
| 2001/0024400 A1 | 9/2001 | Van Der Wel | B01F 27/806 | 366/326.1 |
| 2006/0054549 A1* | 3/2006 | Schoendorfer | B01D 63/069 | 210/321.71 |
| 2008/0245421 A1* | 10/2008 | Iou | E04D 13/0409 | 210/415 |
| 2009/0321333 A1* | 12/2009 | Magliocca | A47J 37/1223 | 210/167.28 |
| 2010/0013232 A1* | 1/2010 | Prigent | B04C 1/00 | 210/171 |
| 2010/0031583 A1* | 2/2010 | Chang | E04D 13/08 | 52/12 |
| 2010/0260622 A1* | 10/2010 | Couston | F03B 3/02 | 417/375 |
| 2011/0180051 A1* | 7/2011 | Schwandt | F01M 13/04 | 123/573 |
| 2011/0220586 A1* | 9/2011 | Levitt | B01D 29/6415 | 210/791 |
| 2011/0271675 A1* | 11/2011 | Toulouse | B01D 19/0036 | 60/639 |
| 2011/0293400 A1* | 12/2011 | Bremond | F03B 3/18 | 415/150 |
| 2011/0309039 A1* | 12/2011 | DeWaard | B30B 9/12 | 210/791 |
| 2012/0010063 A1* | 1/2012 | Levitt | B01D 21/267 | 494/83 |
| 2012/0145609 A1* | 6/2012 | Caffell | B04C 9/00 | 210/415 |
| 2013/0032515 A1* | 2/2013 | Carayon | E03F 5/14 | 210/161 |
| 2014/0035203 A1* | 2/2014 | Oneda | B30B 11/34 | 425/174.4 |
| 2014/0042083 A1* | 2/2014 | Mallard | B01D 29/908 | 210/512.1 |
| 2014/0124432 A1* | 5/2014 | Yoon | B01D 29/114 | 210/355 |
| 2014/0224749 A1* | 8/2014 | Hopkins | B29C 48/2735 | 210/791 |
| 2015/0108057 A1* | 4/2015 | Caffell | B01D 29/908 | 210/295 |
| 2015/0196859 A1* | 7/2015 | Levitt | B01D 29/902 | 210/435 |
| 2015/0258476 A1* | 9/2015 | Boyce | B01D 35/30 | 210/111 |
| 2016/0030875 A1* | 2/2016 | Parikh | B01D 46/0056 | 55/400 |
| 2016/0214039 A1* | 7/2016 | Tameroglu | B01D 29/6446 | |
| 2016/0263589 A1* | 9/2016 | Corcoran | B04C 5/04 | |
| 2016/0310877 A1* | 10/2016 | Levitt | B01D 46/446 | |
| 2016/0317953 A1* | 11/2016 | Canaia | B29C 48/693 | |
| 2016/0361885 A1* | 12/2016 | Oyama | B01F 27/0726 | |
| 2017/0014736 A1* | 1/2017 | Osman Oguz | B01D 29/23 | |
| 2017/0128859 A1* | 5/2017 | Levitt | B01D 29/117 | |
| 2017/0136391 A1* | 5/2017 | Crandall | A46B 3/00 | |
| 2017/0282420 A1* | 10/2017 | Kitamura | A61K 9/2095 | |
| 2017/0282421 A1* | 10/2017 | Kitamura | B01F 33/821 | |
| 2017/0368481 A1* | 12/2017 | Shrivastava | B01D 36/045 | |
| 2017/0368555 A1* | 12/2017 | Franko | B07B 1/06 | |
| 2018/0071663 A1* | 3/2018 | Carayon | B01D 33/073 | |
| 2018/0093211 A1* | 4/2018 | Takahashi | B01D 46/24 | |
| 2018/0207557 A1* | 7/2018 | Nellis | D21C 11/06 | |
| 2018/0310572 A1* | 11/2018 | Staughton | B01D 29/21 | |
| 2019/0118192 A1* | 4/2019 | Moseley | B04C 5/14 | |
| 2019/0193004 A1* | 6/2019 | Carayon | B01D 33/073 | |
| 2020/0230530 A1* | 7/2020 | Levitt | B01D 11/0288 | |
| 2020/0254463 A1* | 8/2020 | Goertz | B01D 29/073 | |
| 2021/0023483 A1* | 1/2021 | Takahashi | C02F 1/001 | |
| 2021/0113946 A1* | 4/2021 | Hoefler | B01D 33/073 | |
| 2021/0151211 A1* | 5/2021 | Bezlepkin | B01D 29/11 | |
| 2022/0001310 A1* | 1/2022 | Jellinggaard | B01D 29/682 | |
| 2022/0095630 A1* | 3/2022 | Staughton | B01D 29/31 | |
| 2022/0184535 A1* | 6/2022 | Okuno | B01D 35/02 | |
| 2022/0305448 A1* | 9/2022 | Zhang | B01F 27/82 | |
| 2022/0339562 A1* | 10/2022 | Vestman | B01D 29/35 | |
| 2023/0228087 A1* | 7/2023 | Majocka | E04D 13/0409 | 285/42 |
| 2023/0417486 A1* | 12/2023 | Van Der Wel | F26B 11/12 | |
| 2024/0058844 A1* | 2/2024 | Sturgill | B01D 41/04 | |

FOREIGN PATENT DOCUMENTS

| | | | | |
|---|---|---|---|---|
| WO | WO-2013178201 A1 * | 12/2013 | | B01D 33/56 |
| WO | WO-2021066716 A1 * | 4/2021 | | B01D 29/35 |

\* cited by examiner

CONICAL FILTER WITH TURBINE POWERED SCRAPER

CROSS-REFERENCE TO RELATED APPLICATIONS

This application is a § 371 national stage entry of International Application No. PCT/SE2020/050920, filed Oct. 1, 2020, which claims priority to Sweden Patent Application No. 1930313-0, filed Oct. 4, 2019, the entire contents of which are incorporated herein by reference.

FIELD OF THE INVENTION

The present disclosure relates to filter assemblies. In particular it relates to a filter assembly with a filter and a cleaning structure comprising a rotatable scraper.

BACKGROUND OF THE INVENTION

Filters for filtering water or other fluids are known in the art. For example, a washing machine may be connected to a filter to capture any debris, particles or fabric which is washed from clothes washed in the machine.

Filter systems may contain cleaning devices or processes which clean the filter and limit filter fouling, that is, clogging of the filter. For example, filters may be cleaned via brushes or back-flushing. However, in washing machine systems such filter cleaning normally takes place via removal of the filter device from an assembly and cleaning whilst the filtering system is offline, or not functioning. Clearly this leads to increased maintenance costs and reduced performance of filter systems.

A system for online, low maintenance cleaning of filters would be desirable. Due to environmental considerations the system should be relatively low energy consumption and not wasteful of clean water.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing an assembly for filtering water comprising: a filter forming a permeable receptacle for fluid to be filtered, an actuating inlet for providing a stream of water, a filter fluid inlet for providing fluid to be filtered to the filter, and, a rotatable cleaning structure for cleaning the filter, wherein the structure comprises at least one scraper extending along and substantially abutting a first surface of the filter, the scraper being rotatable with respect to the first surface of the filter, and wherein the structure further comprises at least one rotatable element arranged for receiving the stream of water, the stream of water being receivable in, and filterable by, the filter and wherein the element is rotationally engaged with the scraper such that the stream of water providing a rotational force to the element, rotates the scraper with respect to the first surface of the filter.

A system comprising the assembly and a washing machine is also provided.

A method for filtering a fluid is provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

Figure 1:
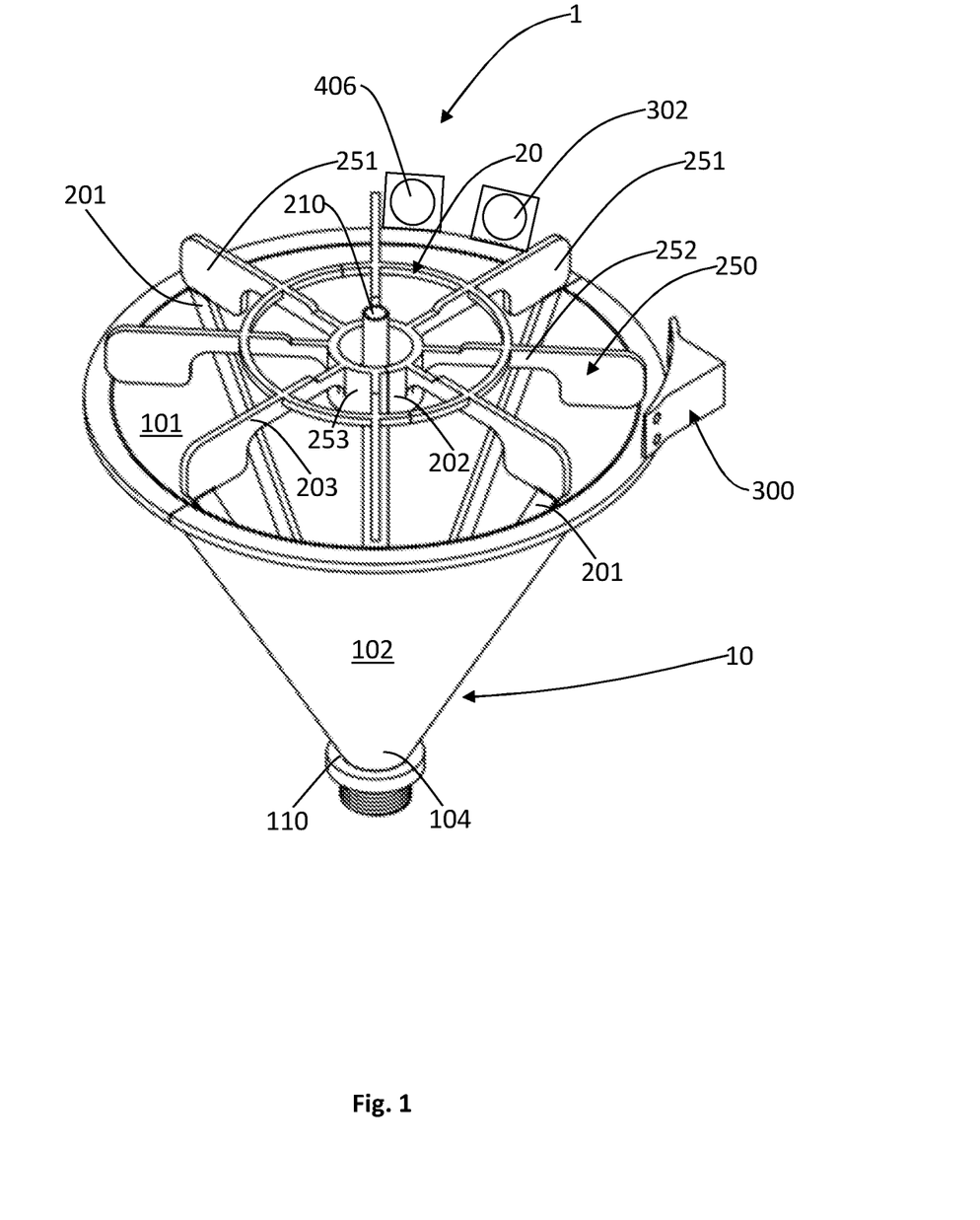
FIG. 1 is a perspective view of an assembly according to an aspect.

FIG. 1 shows an assembly 1 for filtering water comprising a filter 10 forming a permeable receptacle for a fluid to be filtered. The assembly 1 further comprises a structure 20 for cleaning the filter 10 comprising at least one scraper 201 extending along and substantially abutting a first surface 101 of the filter 10. The at least one scraper 201 is rotatable with respect to the filter 10. The structure 20 further comprises at least one element 250 arranged for receiving a stream of water. The element 250 is rotatably engaged to the scraper 201, such that on rotation of the element 250, the scraper 201 is also rotated. Provision of a stream of water to the element 250 rotates the element 250, thereby rotating the scraper 201 and displacing material from the first surface 101 of the filter 10.

Via the assembly 1, the first surface 101 of the filter is cleaned of collected, filtered matter, this cleaning process may also be known as de-fouled, and the filter 10 performance is improved. By using readily available water to rotate the element 250 and therein the scraper 201 the assembly does not require electricity which would otherwise be required for a motor-powered filter cleaning system. The system is less complex, has lower maintenance requirements, and uses less energy than other filter cleaning systems such as those which use electromechanical means to clean a filter. The filter assembly does furthermore not require the fluid to be filtered to be provided at a high flow rate as the actuation of the element 250 may occur via readily available, relatively high pressure, mains tap water. Relatively high pressure in this instance refers to the relative pressure of mains tap water in comparison to a fluid coming from a system, such as a washing machine, which uses and dirties water, which generally only have lower pressure pumps.

The filter 10 forms a permeable receptacle for a fluid to be filtered. The filter 10 is permeable in that, as is generally the case with a filter, particles which are larger than holes present in the filter 10 are kept on one side of the filter 10. Fluid may flow through the filter 10. The filter 10 forms a receptacle in that fluid may collect in the filter 10 and be displaced through the filter due to the force of the volume of water present in the filter. The water is generally not pressurised and forced through the filter with, for example, a pump. The fluid may for example be water from a washing machine, a dishwasher or the like. If the fluid is from a washing machine it may comprise solid particles such as natural and/or synthetic fibres from clothes, dirt which has not dissolved, and/or other particulates such as microplastic particles. Separating the solid matter from the fluid may allow the fluid to be recycled, or may allow disposal of the water to the sewage system with a reduced amount of particles.

The filter 10 comprises the first surface 101 and a second surface 102. In FIG. 1 the filter 10 is conically formed. In the arrangement shown in FIG. 1, the first surface 101 is the inner surface 101, and the second surface 102 is the outer surface 102. Fluid provided to the first surface 101 of the filter 10 flows through the filter 10 and exits the filter at the second surface 102. Particles and matter captured by the filter 10 collect on the first surface 101. Fluid to be filtered is provided to the filter 10 at an upper portion 103 and flows through the filter 10 due to gravity. The fluid is provided to the inside of the receptacle formed by the filter 10.

The filter 10 may be a fabric mesh, membrane or other filter having an array of openings for allowing the passage of fluid, but restricting particles over a pre-determined size. The openings of the mesh or pores may be from about 1 μm to about 500 μm. The filter 10 may be a nylon mesh with openings of around 50 μm. The filter 10 may even be a metallic mesh, such a stainless-steel mesh.

The filter 10 advantageously comprises a portion of reduced diameter 110 at a lower portion 104, such that filtered matter collects at the portion of reduced diameter 110. In FIG. 1, the conical form of the filter 10 enables the collection of displaced material at the tip portion 110 of the cone. The filter 10 may be considered an inverted cone, that is that the tip portion 110 is arranged beneath a wider base portion of the cone. The filter 10 may be, for example, a cylindrical form, however, the conical form has performed best with respect to displacement of filtered matter form the first surface 101 of the membrane 10. In FIG. 1, the tip portion 110 is arranged beneath the larger diameter base portion of the cone.

The filter 10 is provided with an opening 105 at the lower portion 104. The opening 105 is in sealed connection to a valve 106. The valve 106 may for example be a ball valve or other similar valve which is openable to allow the matter collected at the lower portion 104 of the filter 10, to pass through the opening 105 and the valve 106 and exit the filter 10.

The filter 10 may comprise a supporting member, such as a supporting ring, which holds the filter 10 open at its upper portion. This is especially useful if the filter 10 is made of a flexible or compliant fabric or material. The filter 10 may comprise additional supporting members which hold the filter 10 open, and relatively taut, at the middle or lower portions.

The cleaning structure 20 comprises at least one scraper 201 for displacing matter which has collected on the first surface 101 of the filter 10. The scraper 201 is arranged to abut the first surface 101 of the filter 10. The scraper 201 extends along at least a portion of the length of the first surface 101 of the filter 10. The scraper 201 may extend along substantially the full length of the first surface 101 of the filter 10. Rotation of the scraper 201 with respect to the first surface 101 of the filter 10 acts to wipe filtered material from the first surface 101. On rotation of the scraper 201 with respect to the first surface 101, filtered material falls due to gravity, and may be carried by a volume of water present in the receptacle formed by the filter 10 to the lower portion 104 of the filter 10. The filtered material is wiped from the first surface 101. The removal of the filtered material from the first surface 101 reduces blocking of the filter 10, thereby increasing the amount of fluid which can be filtered. The scraper 201 is generally a substantially straight element extending along at least a portion of the length of the first surface 101. The scraper 201 may have a substantially straight middle portion and have upper and lower end portions which are angled slightly away from the first surface 101 of the filter 10 which aid to push out the middle portion of the filter 10 and ensure the filter is taut during a scraping process. The scraper 201 is rotatable around a central axis A. The scraper 201 may be connected to a hub 202 which rotates around the central axis. The central axis may also be the central, rotationally symmetrical, axis of the cone shaped filter 10 as shown in FIG. 1. The scraper 201 may be connected to the hub 202 via a supporting member 203 extending radially outward from the hub 202 and connecting to the scraper 201 at a first end 204 of the scraper 201. As the filter 10 may be conical, the scraper 201 may be arranged at an angle to the central axis. The scraper 201 is generally arranged such that it is substantially parallel with the defining wall formed by the first surface 101 of the filter 10. Having an aligned central axis A for both the filter 10 and the cleaning structure 20 simplifies alignment of the assembly 1.

The structure 20 may comprise a plurality of scrapers 201, each spaced at substantially equal intervals around the central axis of the structure 20. In FIG. 1 the structure 20 has four scrapers arranged at equal distance around the central axis.

The cleaning structure 20 comprises at least one element 250 for receiving a stream of water. The element 250 is rotatable around the central axis A of the structure 20. The element 250 is rotationally engaged, such as rotationally fixed, to the at least one scraper 201. In this way if the at least one element 250 is rotated, the at least one scraper 201, or the plurality of scrapers 201, rotate.

Figure 2:
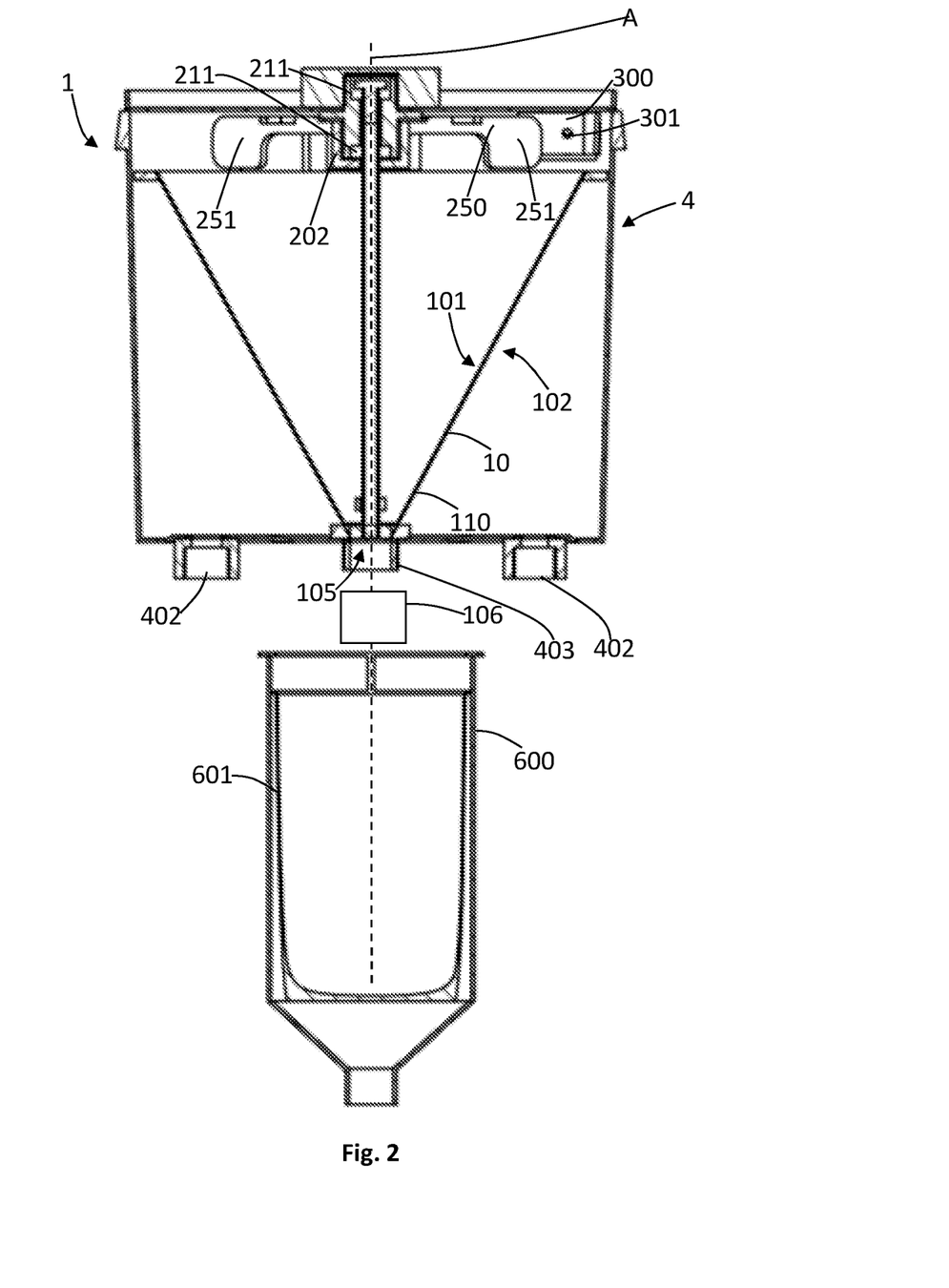
FIG. 2 is a cross-sectional view of an assembly according to an aspect.

The at least one element 250 may comprise a fluid receiving portion 251 for receiving the stream of water. The receiving portion 251 may be a substantially flat portion 251 as shown in FIGS. 1 and 2. However, the receiving portion could, for example, be cup-formed or another suitable shape. If the receiving portion 251 is substantially flat it is generally angled perpendicular to the direction of the applied stream of water from the actuating inlet 300. The stream of water is generally directed in the same plane as the rotational plane of the at least one element 250. This arrangement increases the rotational force applied by the stream of water, compared to a system where the stream of water is directed downwards, through the filter 10, and where elements form a turbine based on fluid flow through the filter 10. The element 250 may comprise a connecting member 252 for connecting the fluid receiving portion 251 to a central hub 253. The central hub 253 to which the at least one element 250 may be connected may be the same hub as the hub 202 to which the at least one scraper 201 is connected. That is, the element 251 and the scraper 201 may be connected to the same hub 202, 253. The connecting member 252 may extend radially outward, having a first end 254 at the hub 253 and a second end 255 at the fluid receiving portion 251.

As shown in FIG. 1, the structure 20 may comprise a plurality of elements 250, each spaced at substantially equal intervals around the structure 20. An element 250 and a scraper 201 may coincide such that they comprise shared structural components. For example, A scraper 201 may coincide with an element 250 such that at the first end 204 of the scraper 201 is provided with a receiving portion 251. The element 250 and the scraper 201 share a combined connecting member 252 and supporting member 203. That is, the connecting member 252 of the element 250 forms the supporting member 203 of the scraper 201. In FIG. 1, the structure 20 is provided with a plurality of elements 250 and a plurality of scrapers 201. Each of the scrapers 201 coincides with an element 250, however, there are a greater number of elements 250 than scrapers 201. In the case of FIG. 1 there are six elements 250 and four scrapers. However, this is simply an example, and a structure could comprise any number of scrapers 201 and/or elements 250.

The structure 20 is provided with a central shaft 210 around which the hub 202, 253 is rotatable. The central shaft 210 is aligned with the central axis. The central shaft 210 provides stability and radial fixation to the structure 20.

The element 250 is rotated with respect to the central axis, and the filter 10, via the provision of a stream of water which applies a force the element 250. The force provided by the stream of water must be sufficient to overcome the friction force present between the first surface 101 of the filter 10 and the scraper 201. The provision of a stream of water, of sufficient force, to the fluid receiving portion 251 causes the element 250 to rotate, this causes the scraper 201 to rotate.

The stream of water may be provided via an actuating inlet 300. The outlet of the actuating inlet 300 is arranged to align with the receiving portion 251 of the element 250. The actuating inlet 300 is generally arranged tangentially to the circumference of the circle formable by the at least one element 250 rotatable around the central axis. That is, the outlet of the actuating inlet 300 is arranged such that water is directed at the receiving portion 251. The actuating inlet 300 may comprise a diameter restricting member 301 which increases the velocity of water exiting the actuating inlet 300 and being provided to the receiving portion 251. The increase in velocity increases the rotational speed at which the element 250 rotates. This increase in speed allows for faster agitation at the first surface 101 of the filter 10 and reduces the amount of water needed to clean the filter 10.

The stream of water is generally provided intermittently. That is, it is generally not provided as a constant stream of water. Providing the stream of water intermittently reduces the consumption of water as the structure 20 need only be rotated when the first surface 101 is in need of cleaning.

The stream of water receivable at the element 250 has a force $F_1$, being greater than the force required to overcome the friction force between the scraper 201 and the filter 10. The stream of water may be a jet of water. The stream of water may be applied to the element 250 for from about 0.1 to about 10 seconds, such as about 1 second. The stream of water provided to the widest part of the inlet 300, that is, before any restriction 301, may be tap water at mains pressure, such as 0.5 bar to about 10 bar.

As the stream of water acts directly on the element 250 and causes rotation via the force of stream, the assembly 1 does not need to be filled with fluid to actuate the scraper(s) 201. The volume of water used for removing debris from the filter surface is therefore substantially reduced compared to systems where the filter is filled/flushed with fluid.

The provision of clean tap water to the assembly 1 via the actuating inlet 300 also improves the cleaning of the filter 10 as the filter 10 is rinsed with clean water every time the stream of water is provided to the element 250. It is therefore ideal that the stream of water provided to the element 250 is subsequently received in the filter 10.

The structure 20 may be provided with a filter fluid inlet 302 for fluid to be filtered. The filter fluid inlet 302 may be arranged such that fluid is directed radially into the filter 10 from above.

The filter fluid inlet 302 and the actuating inlet 300 may be provided on the same side of the central axis A, such that any rotational force provided by the filter fluid acts in the same direction as the rotational force provided by the actuating fluid. The filter fluid and the actuating fluid, i.e., the stream of water, are both receivable in and filterable by the filter 10. The actuating fluid and the filter fluid are filtered after they have been received in the filter 10.

As opposed to other filter cleaning assemblies this present assembly 1 does not require any backwashing process. Fluid provided to the assembly 1 flows through the filter 10. The actuating fluid and the filter fluid flow from the first side 101 of the filter 10 to the second side 102 of the filter 10. This simplifies construction as fewer valves and pumps are necessary, reduces water consumption as less water is discarded, and also simplifies maintenance as all filtered waste is collected via the same process.

The assembly 1 may comprise a tank 4. The structure 20 and filter 10 of the assembly 1 may be provided within a tank 4. The tank 4 receives fluid to be filtered and after filtration, filtered fluid is present in one portion of the tank, whilst the material which has not passed through the filter 10 is present within the filter 10, and in a different portion of the tank 4.

The tank 4 may be provided with a fluid inlet 401 for the provision of fluid to be filtered. The fluid inlet 401 may coincide with filter fluid inlet 302 of the structure 20.

The tank 4 is provided with at least one first outlet 402 for filtered fluid, located between the filter 10 and the wall of the tank 2. The tank 2 is provided with a second outlet 403 for filtered solids and matter removed from the fluid. The second outlet 403 is located in line with the central axis of the structure 20 and filter 10. The second outlet 403 coincides with the opening 105 and/or the valve 106 of the filter 10.

The assembly 1 may be provided with a sensor 404 for determining the presence of fluid. The sensor 404 may be arranged between the wall of the tank 4, and the second surface 102 of the filter 10. A control means adapted to receive a signal from the sensor 404 may therefore receive information on whether fluid is flowing through the filter 10. The control means may thereafter open a valve in the assembly which enables the stream of water to flow via the actuating inlet 300 and to rotate the structure 20. The control means may open the valve dependent on the duration for which water has been detected, or another parameter such as the level or flowrate of fluid.

Figure 4:
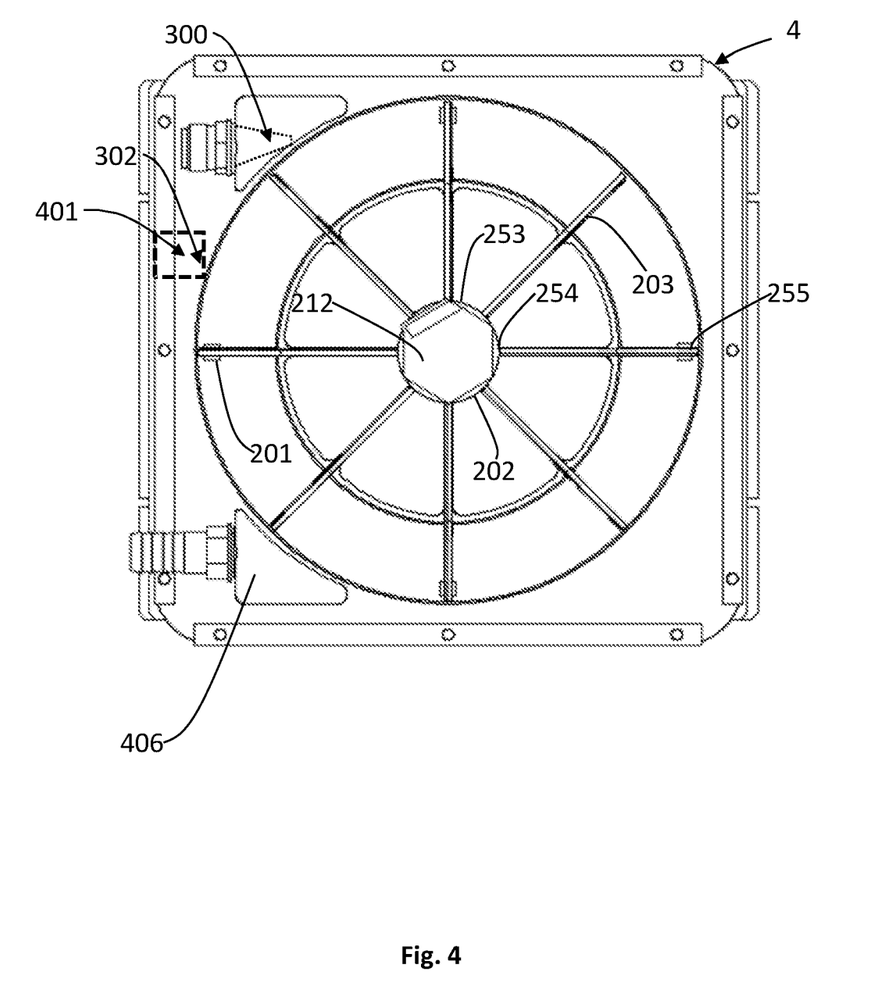
FIG. 4 is a top down view of an assembly according to an aspect.
Figure 5:
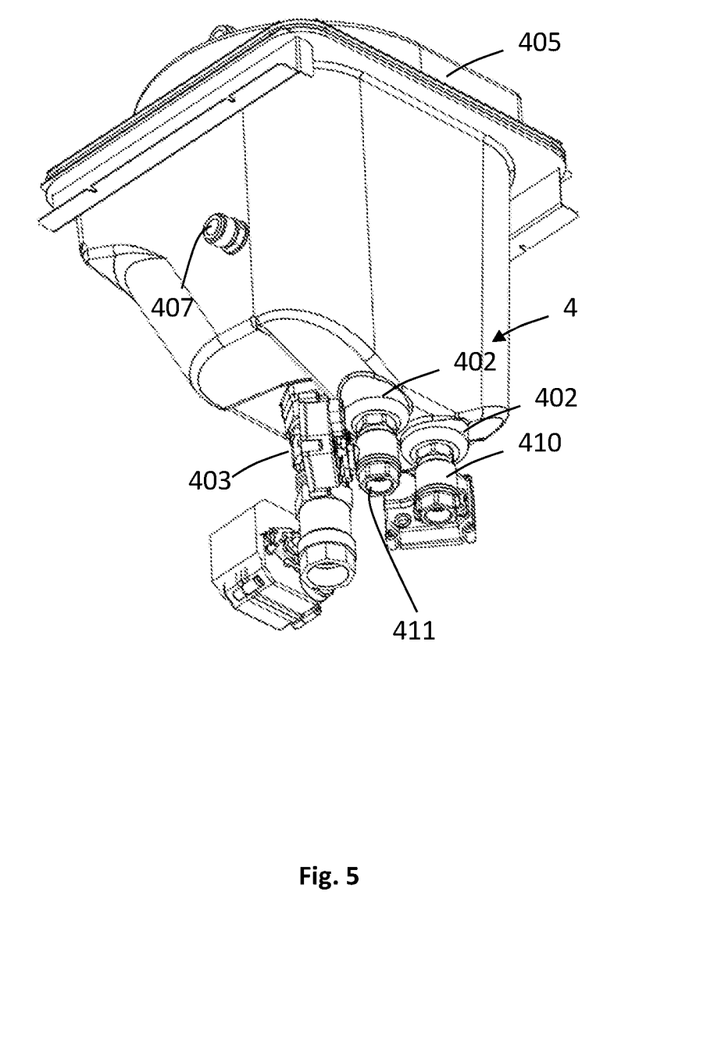
FIG. 5 is a perspective view of an assembly according to an aspect.

The structure 20 may be held in place via a lid member 405 of the tank 4. The structure 20 may comprise a plurality of bearings 211 arranged between the hub 202, 253 and the central shaft 250. The plurality of bearings 211 may be arranged at a distance from each other, that is, they may not be adjacent to each other such that the shaft 250, and therein the structure 20, is held with greater stability. A first of the plurality of bearings 211 may be arranged on one side of the lid 405 of the tank 4. A second of the plurality of bearings 211 may be arranged on the opposing side of the lid 405 of the tank 4 with respect to the first bearing. By fixing the structure 20 to the lid member 405 the structure may be easily removable for inspection and maintenance. The lid member 405 also enables better alignment of the structure 20 within the tank 4, and the filter 10. The central shaft 210 may be maintained in position in the assembly 1 by a cap 212. The lid member 405 is not shown in FIG. 4, the assembly 1 is shown with the lid member 405 removed. In FIG. 4 the position of the filter fluid inlet 302 on the assembly 1 is shown as a rectangle with a dashed outline. The filter fluid inlet 302 is generally provided to the lid member 405, and as the lid member 405 is not shown in FIG. 4.

Figure 6:
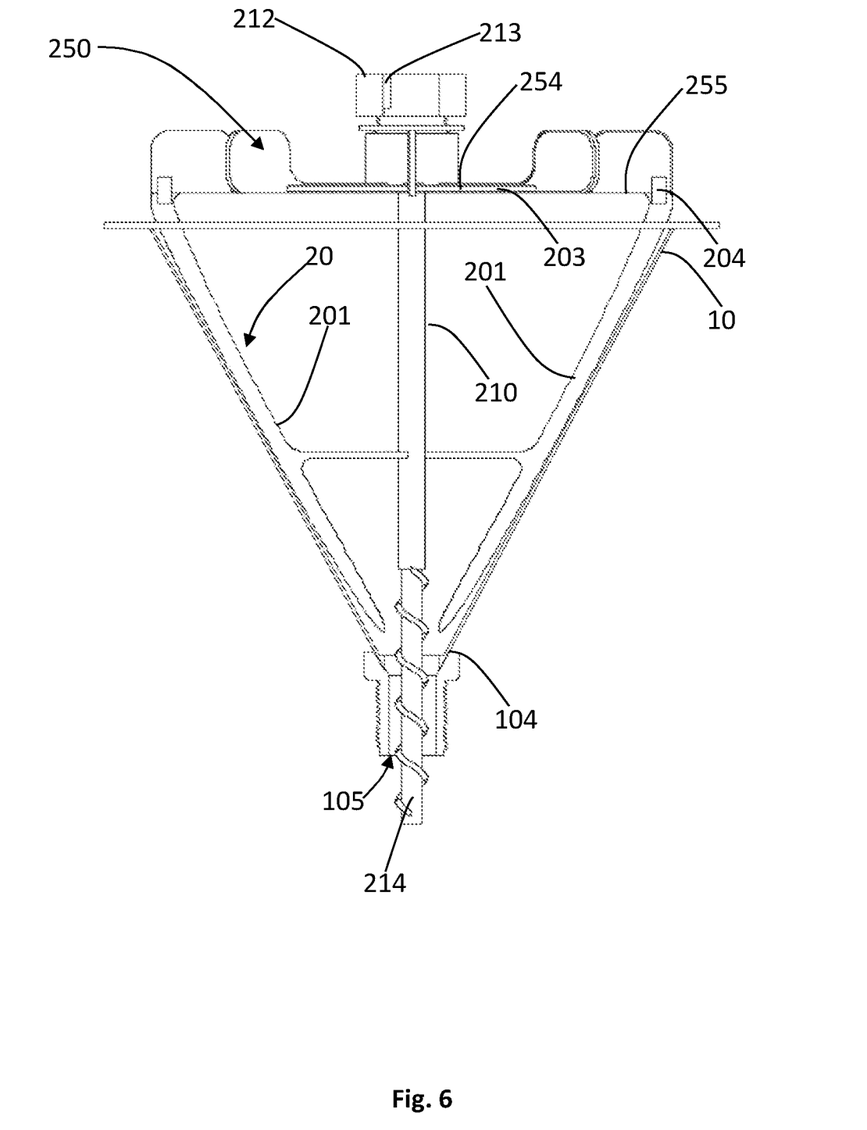
FIG. 6 is a perspective, partial view of an assembly according to an aspect.

As shown in FIG. 6, an upper portion of the assembly 1, an in particular an upper portion of the structure 20, may be provided with a sensor 213 to detect rotation of the structure 20. The sensor 213 may for example be a magnetic rotary sensor 213 detecting each rotation of the structure 20. A magnet may be provided to the cap 212, and a sensor for detecting the presence of the magnetic field may be provided adjacent the cap 212.

The rotation sensor 213 detects each rotation of the structure 20. The amount of water used to actuate the structure 20 may thereby be controlled with respect to the number of detected rotations of the structure 20. For example, if the stream of water is provided to the structure 20 and the rotation sensor 213 detects a rotation, or several rotations, then the actuating stream of water may be ceased. In such a manner the amount of water used to actuate the structure 20 can be controlled. The number of rotations of the structure 20 detected by the sensor 213 during a period of time may be used to determine the cleanliness of the fluid to be filtered or the amount of filtered waste collecting on the first surface 101 of the filter 10. That is, fewer rotations during a set period of time may indicate that the water is dirtier, or that more filtered waste is collecting on the filter 10.

The tank 4 may be provided with an overflow outlet 406 at an upper portion of the tank. The overflow outlet 406 may be provided in connection to the filter 10, and/or the structure 20. If fluid does not exit the tank 4 at the first outlet 402, or the second outlet 403 at a sufficient rate then the fluid may fill the filter 10 and overflow via the overflow outlet 406. The fluid may not exit the filter because the flow-rate of fluid into the filter 10 is too high with respect to the flow rate possible through the filter, or for another reason, such as that the filter 10 is blocked. The overflow outlet 406 is connected to a sewage line.

The overflow 406 also enables the assembly 1 to be substantially at atmospheric pressure during use. Generally the tank 4 is not pressurised and the fluids within the assembly 1 are open to atmospheric pressure.

Figure 3:
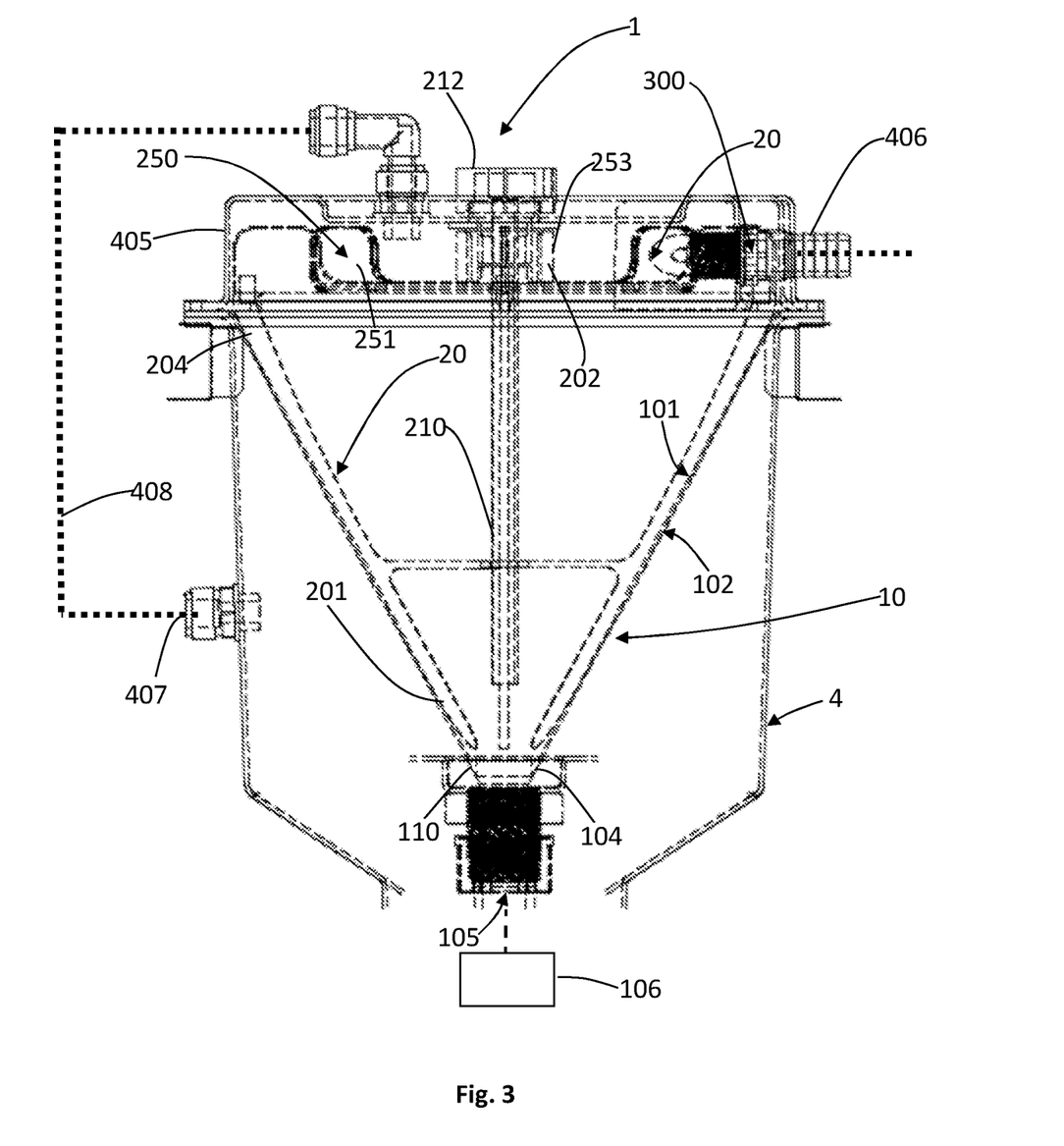
FIG. 3 is a cross-sectional view of an assembly according to an aspect.

As shown in FIG. 3, the tank 4 may be provided with a hole 407 in connection with a fluid conduit 408 for at least the release of gas trapped between the filter 10 and the wall of the tank 4. As fluid enters and subsequently passes through the filter 10 any trapped air between the filter 10 and the wall of the tank 4 is displaced. This has been noted to cause ballooning of the filter 10 and to increase the backpressure of fluid passing through the filter 10, and therefore leads to reduced filter 10 performance. By providing a hole 407 connected to the conduit 408, which has an outlet 409 at a level higher than the maximum height of water in the tank, such as higher than the lid member 405 of the tank 4, then trapped air is released.

Figure 7:
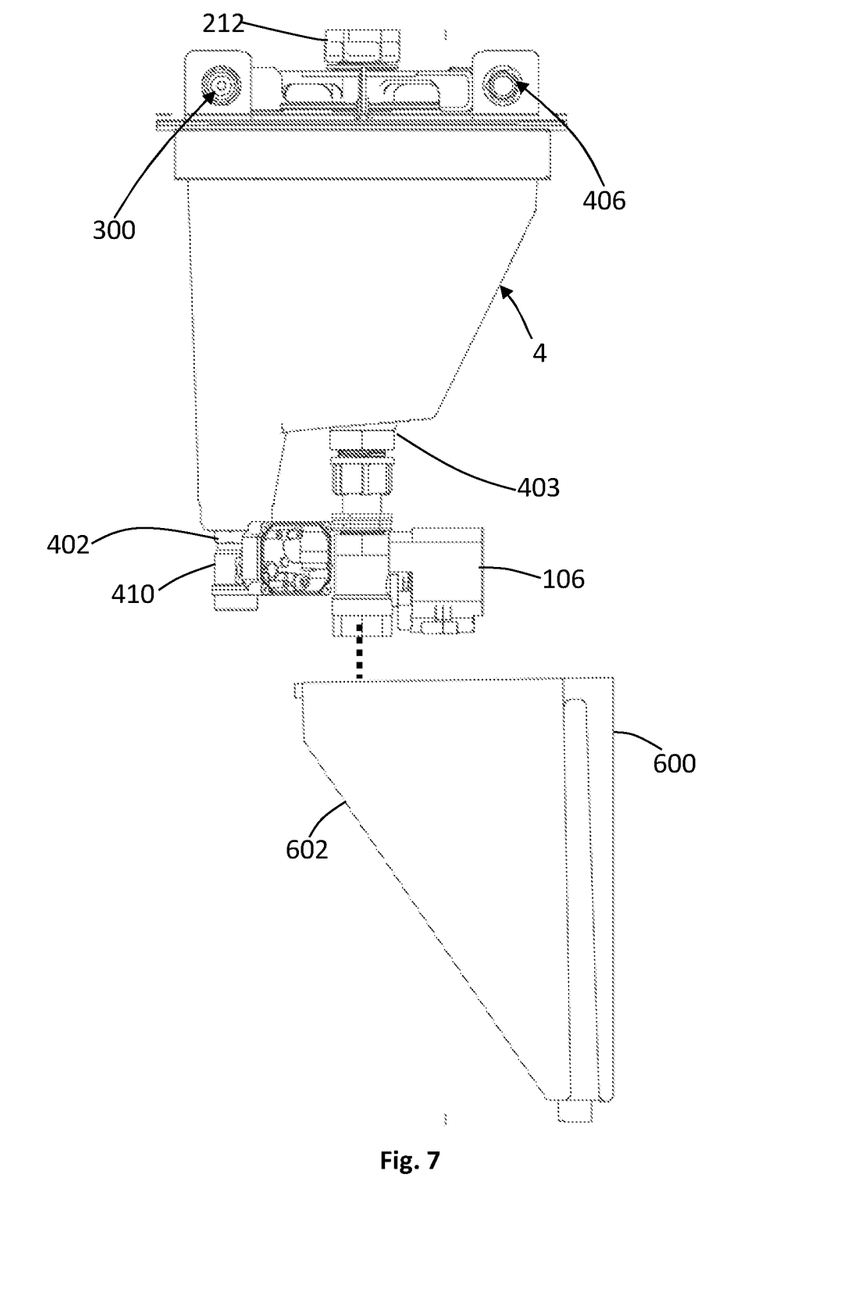
FIG. 7 is a perspective view of an assembly according to an aspect.

As described above, filtered matter agitated from the first surface 101 of the filter 10 collects at the lower portion 104 of the filter 10. The valve 106 may be opened to allow the collected matter to flow from the filter 10. As shown in FIGS. 2 and 7, a receptacle 600 for filtered waste matter may be arranged in fluid connection with the valve 106. The receptacle 600 is generally arranged relatively beneath the valve 106 such that the filtered waste matter falls due to the gravity into the receptacle 600. In FIG. 7 the flow of waste matter is shown by the vertical dotted line.

The receptacle 600 may be provided with a filter 601 of the same or different type as the filter 10, which traps the filtered waste material but allows any water to pass through the filter. The filter 601 of the receptacle 600 therein forms a second stage filter 601. The receptacle is removable and the filtered waste matter can simply be disposed of in a waste receptacle, for example, a bin or trash-can. The filtered waste matter present in the receptacle 600 is concentrated with respect to the waste matter present in the filter 10, there is generally a greater mass of matter per volume. The receptacle 600 is defined by a wall 602. The receptacle 600 has an opening at its upper portion for receiving the waste matter. The receptacle 600 is generally closed at its lower portion and may be removed by a user for waste disposal.

As shown in FIG. 6, an agitator 214 may be provided to the lower portion of the structure 20. The agitator 214 may be provided to the lower portion of the central shaft 210 proximal the lower portion 104 of the filter 10. The agitator 214 may extend through the lower portion 104 of the filter 10, through the opening 105. The agitator 214 may therefore be proximal the valve 106. The agitator 214 aids in the removal of filtered waste from the lower portion of the filter 10 and aids displacement of the filtered waste from the filter 10 through the opening 105, the valve 106, into the receptacle 600. The agitator may be, as shown in FIG. 6, a longitudinally extending element having at least one blade, for agitation of the filtered waste matter.

Filtered fluid at the first outlet 402 may be recycled to a washing machine, or may be stored for later recycling to a washing machine as is described in Swedish patent application SE1751551-1, in this case the tank 4 forms the first water tank 201 in the mentioned application.

The assembly 1 may be provided in connection to a water consumption device, such as a washing machine, dishwasher or other water consumption device which generates waste water which may be filtered by the assembly 1. The assembly 1 and the water consumption device thereby form a system comprising a water consumption device and the assembly 1. The outlet of the water consumption device is provided in connection to the filter fluid inlet 302 of the assembly 1. The tank 4 is generally provided with a first outlet 410 provided in connection to a water consumption device, or a second tank as described SE1751551-1. The tank 4 is generally provided with a second outlet 411 provided in connection to a waste water outlet. Each of the outlets 410, 411 is provided with valves which may be opened or closed. The valves, and therein the outlets 410, 411 are controlled by water quality and/or level sensors to determine whether filtered water, which has flow through the filter 10, should be recycled or discarded.

As fresh water is provided via the actuating inlet 300, and water from the first water tank in the mentioned application is always tested for whether it is recyclable, the fresh water used in the present filter assembly 1 is never simply used to power the rotation of the element 250, it may always be recycled.

As stated above, the actuating inlet 300 may provide a stream of fresh water, such as tap water at mains pressure as the actuating fluid. In some instances, such as in areas of reduced water availability the actuating water may be stored water, either recycled or fresh water, which is pumped to the actuating inlet. This may for example be suitable in environments where energy for powering a pump is available, but where tap water at mains pressure is not available.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A fluid powered self-cleaning filtration apparatus comprising:
   a filter housing (4) defining an interior volume, the filter housing (4) including a fluid inlet (302) at an upper end of the filter housing (4) for introduction of a liquid to be filtered into the interior volume, and a first outlet (402) located at a bottom of filter housing (4);
   a conically shaped fluid permeable filter (10) disposed within the interior volume, the conically shaped fluid permeable filter (10) having a largest cross-section at the upper end of the filter housing (4) and a smaller cross-section at a lower portion of the filter housing (10) defining a receptacle that liquid to be filtered is introduced into by fluid inlet (302), with introduced liquid being displaced through the filter (10) due to the force of the volume of liquid present in the filter, producing a filtrate which may exit the filter housing (4) through the first outlet (402);
   a rotatable cleaning structure (20) for cleaning the filter (10), wherein the rotatable cleaning structure (20) includes:
      at least one scraper (201) within the receptacle extending along and substantially abutting a first surface (101) of the filter (10), the at least one scraper (201) being rotatable with respect to the first surface (101) of the filter (10); and
      a plurality of rotatable elements (250) rotationally engaged with the at least one scraper (201);
   an actuating inlet (300) for providing a stream of water, an outlet of the actuating inlet (300) is arranged to direct the stream of water towards at least one of the plurality of rotatable elements (250) to provide a rotational force to the rotatable elements (250), which causes the scraper (201) to rotate along the first surface (101) of the filter (10).

2. The fluid powered self-cleaning filtration apparatus of claim 1, wherein the actuating inlet (300) is in fluid communication with the receptacle such that the stream of water flows through the filter (10) from the first surface (101) to the second surface (102) after it strikes at least one of the plurality of rotatable elements (250).

3. The fluid powered self-cleaning filtration apparatus of claim 1, wherein the actuating inlet (300) is capable of providing the stream of water intermittently.

4. The fluid powered self-cleaning filtration apparatus of claim 1, further comprising a supporting member (203) connected to a first end (204) of the scraper (201) which connects the scraper (201) to a hub (202) rotatable around a central axis (A) of the cleaning structure (20) and filter (10).

5. The fluid powered self-cleaning filtration apparatus of claim 1, wherein the element (250) comprises a fluid receiving portion (251) for receiving the stream of water, and a connecting member (252) connecting the fluid receiving portion (251) to a central hub (253).

6. A water filtration system comprising:
   a water consumption device; and
   the fluid powered self-cleaning filtration apparatus of claim 1, wherein a water outlet of the water consumption device is in fluid communication with fluid inlet (302) of the filter (10).

7. The water filtration system of claim 6, wherein the water consumption device is a washing machine or a dishwasher.

8. A method of filtering a liquid with a fluid powered self-cleaning filtration apparatus, comprising:
   providing the fluid powered self-cleaning filtration apparatus of claim 1;
   introducing a liquid to be filtered into the receptacle of the filter (10);
   collecting filtered waste matter on the first surface (101) of the filter (10);
   directing a stream of water towards at least one of the plurality of rotatable elements (250) thereby rotating the plurality of rotatable elements (250), causing rotation of the scraper (201) with respect to the first surface (101), thereby wiping any accumulated filtered waste matter from the first surface (101) of the filter (10), and receiving the stream of water in the filter (10).

9. The method of filtering according to claim 8, further comprising passing the stream of water through the filter (10) thereby filtering the stream of water with the filter (10).

* * * * *